United States Patent
Umeda et al.

(10) Patent No.: US 9,943,906 B2
(45) Date of Patent: Apr. 17, 2018

(54) POWDER SUPPLY APPARATUS

(71) Applicant: DENSO CORPORATION, Kariya, Aichi-pref. (JP)

(72) Inventors: Manabu Umeda, Kariya (JP); Junichi Furukawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/232,119

(22) Filed: Aug. 9, 2016

(65) Prior Publication Data
US 2017/0165750 A1 Jun. 15, 2017

(30) Foreign Application Priority Data
Dec. 15, 2015 (JP) .................................. 2015-243980

(51) Int. Cl.
B22F 3/00 (2006.01)
G01F 11/40 (2006.01)
G01F 11/28 (2006.01)

(52) U.S. Cl.
CPC ............ B22F 3/004 (2013.01); G01F 11/282 (2013.01); G01F 11/40 (2013.01)

(58) Field of Classification Search
CPC ......... B22F 3/004; G01F 11/282; G01F 11/34
See application file for complete search history.

(56) References Cited

U.S. PATENT DOCUMENTS

| 2,260,456 | A | * | 10/1941 | Johnson | ............ | B30B 11/08 141/73 |
| 2,675,584 | A | * | 4/1954 | Fienberg | ............ | B30B 15/304 141/135 |
| 2,815,046 | A | * | 12/1957 | McBean | ............ | B65B 1/363 141/142 |
| 3,045,717 | A | * | 7/1962 | Vogt | ............ | B65B 39/001 141/12 |
| 3,353,722 | A | * | 11/1967 | Mehta | ............ | A61J 3/07 141/144 |
| 3,654,970 | A | * | 4/1972 | Teboul | ............ | G01G 13/00 141/284 |
| 4,813,818 | A | * | 3/1989 | Sanzone | ............ | B22F 3/004 141/250 |
| 5,775,389 | A | * | 7/1998 | Griffin | ............ | B65B 1/36 141/100 |
| 6,155,028 | A | * | 12/2000 | Nagata | ............ | B30B 15/302 141/71 |
| 6,343,715 | B1 | * | 2/2002 | Wolfrom | ............ | B28B 13/023 141/284 |

(Continued)

FOREIGN PATENT DOCUMENTS

| JP | H09-184001 | 7/1997 |
| JP | H10-314994 | 12/1998 |

(Continued)

*Primary Examiner* — Timothy L Maust

(74) *Attorney, Agent, or Firm* — Nixon & Vanderhye P.C.

(57) ABSTRACT

A powder supply apparatus includes a feeder, which has a supply passage for supplying powder material to a molding hole of a die, and a hopper, which is separate from the feeder and has an accumulation passage for supplying the powder material into the supply passage. The supply passage extends in a vertical direction throughout an entire extent of the supply passage. A shape of a cross section of the supply passage coincides with a shape of a cross section of the molding hole.

14 Claims, 12 Drawing Sheets

(56) References Cited

U.S. PATENT DOCUMENTS

| | | | |
|---|---|---|---|
| 6,485,284 B1 * | 11/2002 | Rowland | B22F 3/004 141/67 |
| 7,252,120 B2 * | 8/2007 | Beane | B22F 3/004 141/67 |
| 7,255,139 B2 * | 8/2007 | Tochio | B30B 15/304 141/125 |
| 8,113,245 B2 * | 2/2012 | Federzoni | B65B 1/28 141/52 |

FOREIGN PATENT DOCUMENTS

| | | |
|---|---|---|
| JP | H11-245092 | 9/1999 |
| JP | 2002-153994 | 5/2002 |
| JP | 2006-37219 | 2/2006 |
| JP | 2008-75157 | 4/2008 |

* cited by examiner

POWDER SUPPLY APPARATUS

CROSS REFERENCE TO RELATED APPLICATION

This application is based on and incorporates herein by reference Japanese Patent Application No. 2015-243980 filed on Dec. 15, 2015.

TECHNICAL FIELD

The present disclosure relates to a powder supply apparatus used in a powder molding apparatus, in which powder material is compression molded.

BACKGROUND

In a powder molding apparatus, which molds powder material, such as metal powder material, by way of compacting, the powder material, which is placed in a molding hole of a die, is compacted while the powder material is held and is compressed between an upper punch and a lower punch. Thereby, a powder molded product is molded. The powder material is supplied from a powder supply apparatus into the molding hole. The powder supply apparatus includes a hopper and a feeder. The hopper accumulates the powder material. The feeder holds the powder material, which is supplied from the hopper, and the feeder is slidable over the die. The feeder, which holds the powder material, is moved to a location above the molding hole. Then, the powder material is flown down, i.e., is dropped from the feeder into the molding hole. Thereafter, the feeder is retreated away from the location above the molding hole. In this way, the powder material, which is filled into the molding hole, is cut off and is thereby leveled with the feeder, and the process of filling the powder material into the molding hole is completed.

Furthermore, for example, JP2002-153994A teaches a technique of minimizing uneven compaction and particle size segregation of the powder that would occur at the time of cutting off, i.e., leveling the powder filled in the die. Specifically, at least a surface layer region of the powder filled in the die is partitioned into a plurality of small compartments in a surface direction with a partitioning member. Thereafter, this powder is cut off and is thereby leveled with a feeder box.

However, in the powder supply apparatus of JP2002-153994A, a cross sectional area of a supply passage of the feeder, which holds the powder material, is formed to be larger than a cross sectional area of an opening of the molding hole. Therefore, the powder material, which is flown down from the feeder into the molding hole, not only falls in the vertical direction but also flows in a direction that crosses the vertical direction. Thereby, a bulk density bias may possibly occur at respective parts of the powder material filled in the molding hole. In other words, a substantial density difference(s) of the powder material may possibly occur among the respective parts of the powder material. This bias in the bulk density may become an obstacle in the improvement of the accuracy of the powder molding.

SUMMARY

The present disclosure is made in view of the above point. According to the present disclosure, there is provided a powder supply apparatus including a feeder that has a supply passage, which supplies powder material to a molding hole of a die. At least a lower end portion of the supply passage extends in a vertical direction and has a cross section that has a shape, which coincides with a shape of a cross section of the molding hole that extends in the vertical direction.

BRIEF DESCRIPTION OF THE DRAWINGS

The drawings described herein are for illustration purposes only and are not intended to limit the scope of the present disclosure in any way.

DETAILED DESCRIPTION

A powder supply apparatus according to an embodiment of the present disclosure will be described with reference to the accompanying drawings.

Figure 1:
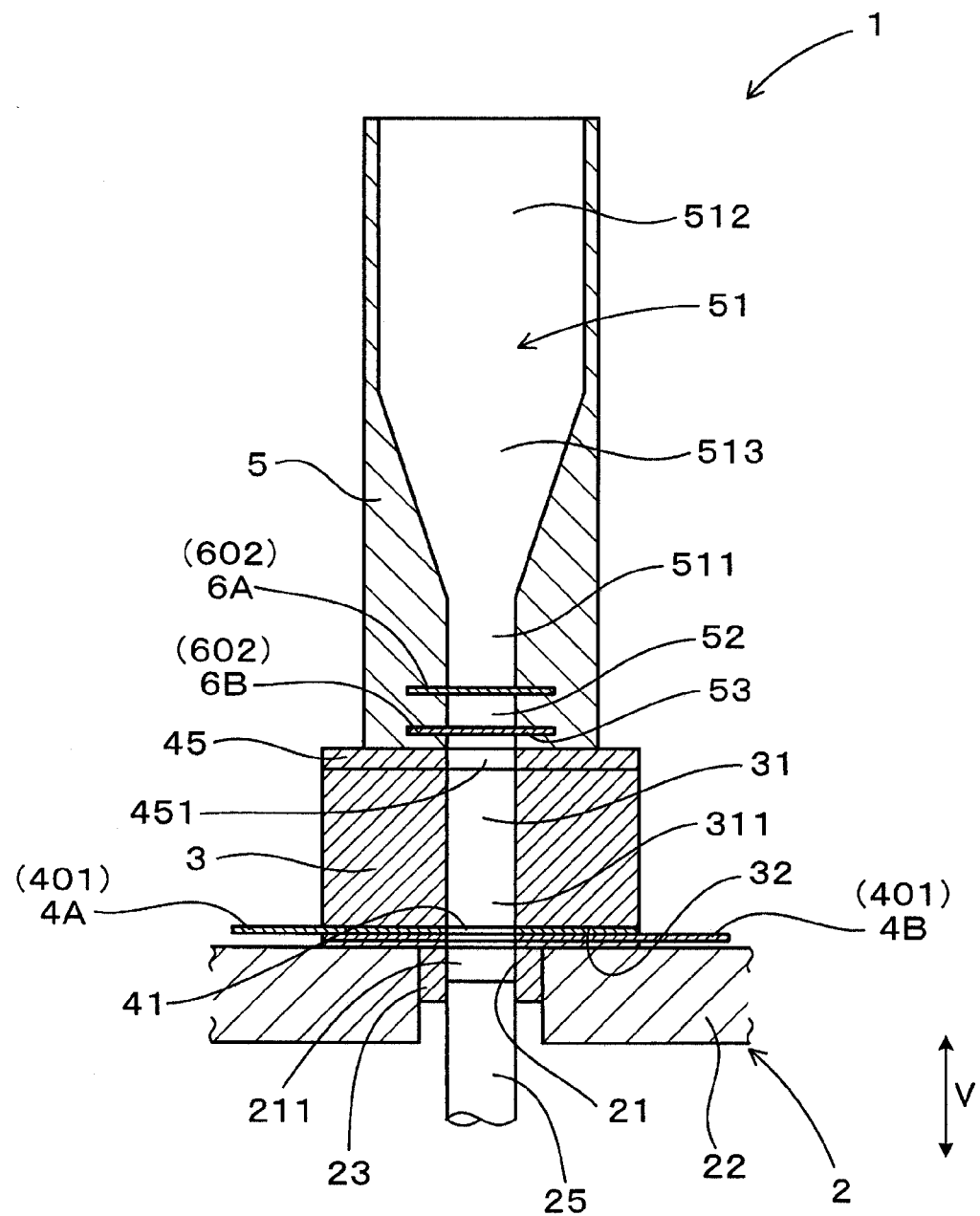
FIG. 1 is a cross sectional view of a powder supply apparatus of an embodiment of the present disclosure seen in a sliding direction of a feeder.
Figure 2:
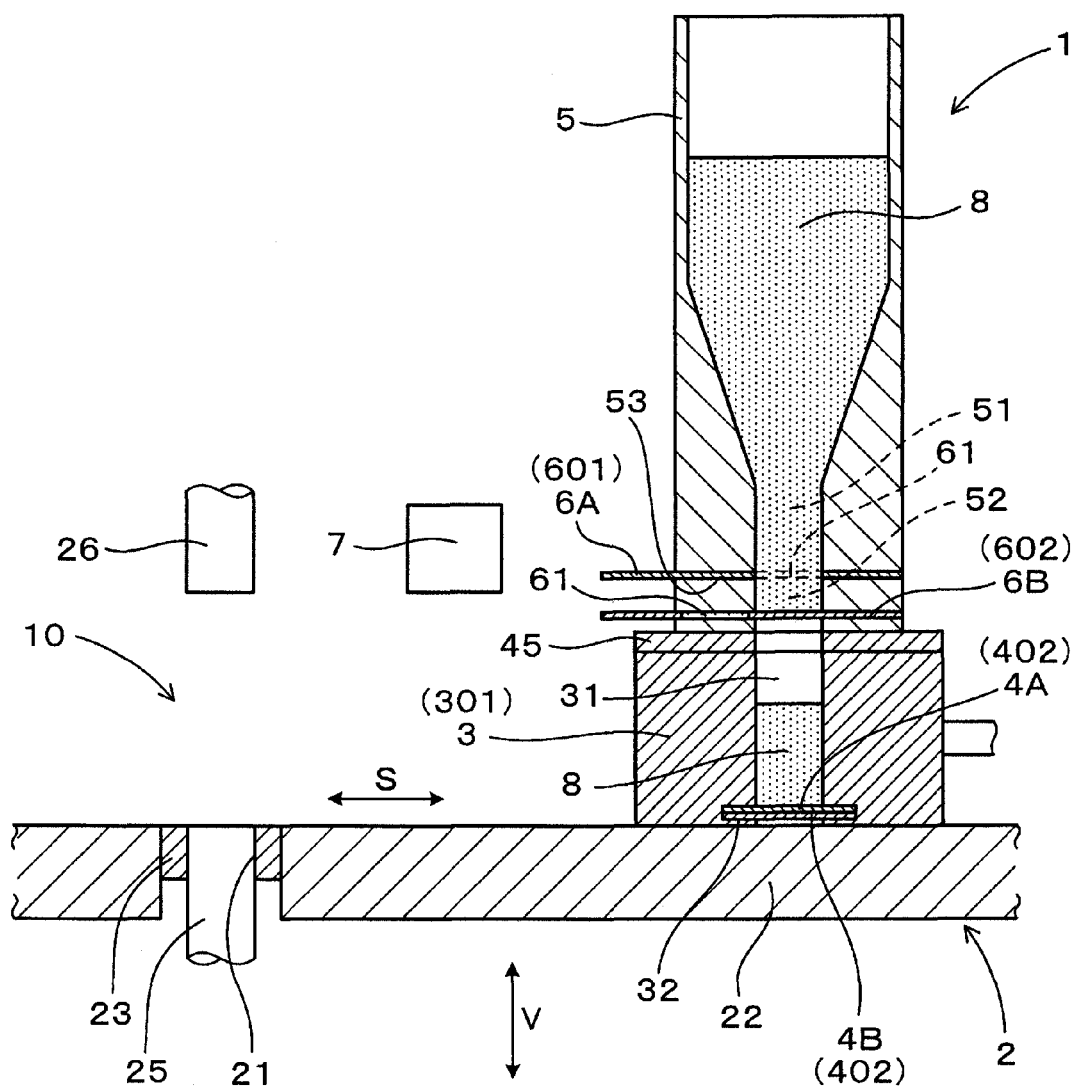
FIG. 2 is a cross sectional view of the powder supply apparatus of the embodiment seen in a direction perpendicular to the sliding direction of the feeder, indicating the feeder being opposed to a lower portion of a hopper.

As shown in FIGS. 1 and 2, the powder supply apparatus 1 of the present embodiment includes a feeder 3 that has a supply passage 31 for supplying powder material 8 into a molding hole 21 of a die 2. The supply passage 31, which includes a lower end portion 311, extends in a vertical direction V and has a cross section that has a shape, which coincides with a shape of a cross section of the molding hole 21 that extends in the vertical direction V. In other words, the cross section of the supply passage 31 is identical to the cross section of the molding hole 21 within a predetermined tolerable range.

Hereinafter, the powder supply apparatus 1 of the present embodiment will be described in detail.

Figure 10:
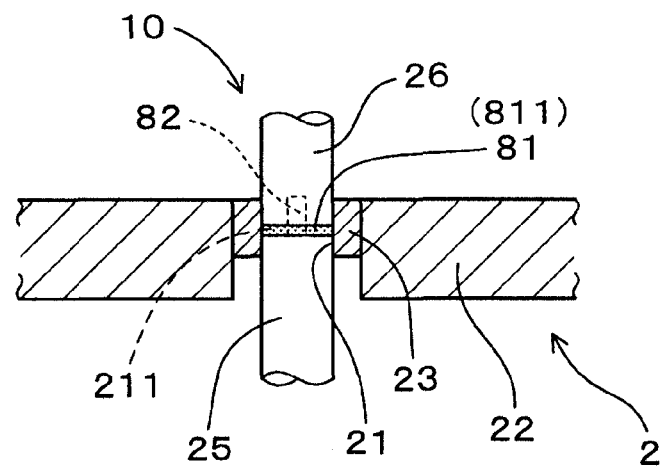
FIG. 10 is a cross sectional view showing an area around an upper punch and a lower punch seen in the direction perpendicular to the sliding direction of the feeder, indicating a powder molded product molded between the upper punch and the lower punch.

As shown in FIG. 10, the powder supply apparatus 1 is used in a powder molding apparatus 10, which includes the die 2, a lower punch 25 and an upper punch 26. The lower punch 25 is inserted into the molding hole 21 of the die 2 from a lower side of the molding hole 21 to compress the powder material 8 in the molding hole 21 from the lower side. The upper punch 26 is inserted into the molding hole 21 of the die 2 from an upper side of the molding hole 21 to compress the powder material 8 in the molding hole 21 from the upper side.

The powder material 8, which is supplied from the powder supply apparatus 1 into the molding hole 21 of the die 2, is metal powder. In the powder molding apparatus 10, the metal powder, which is supplied into the molding hole 21, is compressed, i.e., compacted with the lower punch 25 and the upper punch 26, so that a metal powder molded body is molded. This metal powder molded body is small and can be made into a final product without performing a cutting process on the metal powder molded body by improving a molding accuracy thereof.

As shown in FIGS. 1 and 2, the powder supply apparatus 1 includes a hopper 5 besides the feeder 3. The hopper 5 has an accumulation passage 51, through which the powder material 8 is flow down into the supply passage 31 of the feeder 3.

The die 2 and the lower punch 25 are displaceable relative to each other by an actuator to form a cavity 211, which has a predetermined volume, between an upper surface of the die 2 and an upper surface of the lower punch 25 in the molding hole 21. The powder material 8 to be molded into the powder molded product 81 is filled into the cavity 211.

The feeder 3 is formed separately from the hopper 5. The feeder 3 is slidable to a location, which is below the hopper 5, and a location, which is above the molding hole 21.

As shown in FIGS. 1 and 2, the supply passage 31 of the feeder 3 is formed such that the supply passage 31 downwardly conducts the powder material 8 only in the vertical direction V while limiting flowing of the powder material 8 in a direction that crosses the vertical direction V. An entire extent of the supply passage 31 is formed to extend linearly in the vertical direction V and has the cross section that has a shape, which coincides with the shape of the cross section of the molding hole 21 of the die 2. The molding hole 21 and the supply passage 31 are shaped into a cylindrical form having a circular cross section. The die 2 is divided into a plate die 22, which is shaped into a plate form, and a ring die 23, which is shaped into a ring form. The wear resistance of the ring die 23 is better than that of the plate die 22, and the ring die 23 serves as a die main body. The molding hole 2 is formed in the ring die 23, and the ring die 23 is inserted into the plate die 22.

As shown in FIG. 1, the accumulation passage 51 of the hopper 5 is formed such that a passage forming direction (i.e., an extending direction or a longitudinal direction) of the accumulation passage 51 extends in parallel with the vertical direction V. The hopper 5 is configured such that the amount of powder material accumulated in the accumulation passage 51 is minimized. The cross section of the lower end portion 511 of the accumulation passage 51 has a shape that coincides with a shape of the cross section of the supply passage 31. An inner diameter of the upper end portion 512 of the accumulation passage 51 is larger than an inner diameter of the lower end portion 511. An intermediate portion 513, which is tapered, is formed between the lower end portion 511 and the upper end portion 512. The shape of the cross section of the upper end portion 512 and the shape of the cross section of the lower end portion 511 are similar to each other. The intermediate portion 513 is shaped into a conical form that has a progressively decreasing inner diameter toward the lower side.

The inner diameter of the lower end portion 511 of the accumulation passage 51 of the hopper 5 and the inner diameter of the supply passage 31 of the feeder 3 are the same as the inner diameter of the molding hole 21 of the die 2 within a predetermined tolerable error range.

In the powder supply apparatus 1 of the present embodiment, the supply passage 31 of the feeder 3 and the accumulation passage 51 of the hopper 5 extend in the vertical direction V like the molding hole 21 of the die 2. The shape of the cross section of the lower end portion 511 of the accumulation passage 51 of the hopper 5, the shape of the cross section of the supply passage 31 of the feeder 3, and the shape of the cross section of the molding hole 21 of the die 2 coincide with each other within a predetermined tolerable error range.

Thereby, at the time of supplying the powder material 8 from the accumulation passage 51 to the supply passage 31, the powder material 8 can be flown down in the vertical direction V. Furthermore, at the time of supplying the powder material 8 from the supply passage 31 to the molding hole 21, the powder material can be flown down in the vertical direction V. At the time of supplying the powder material 8 from the hopper 5 to the feeder 3 and at the time of supplying the powder material 8 from the feeder 3 to the molding hole 21, it is possible to limit flow of the powder material 8 in a direction that crosses the vertical direction V. Therefore, it is possible to limit generation of a bias of the bulk density at the respective circumferential parts of the powder material 8 filled in the molding hole 21 of the die 2. In other words, it is possible to limit occurrence a substantial density difference(s) of the powder material 8 among the respective circumferential parts of the powder material 8. Therefore, occurrence of a thickness variation at the respective circumferential parts of the powder molded product 81 made of the powder material 8 can be limited, and thereby a molding accuracy of the powder molded product 81 can be improved.

Here, the circumferential direction refers to a circumferential direction about a central axis of the molding hole 21, which extends in the vertical direction V. Furthermore, the thickness of the powder molded product 81 refers to a thickness defined by a depth of the cavity 211 of the molding hole 21.

As shown in FIGS. 1 and 2, upper and lower shutters (a pair of shutters) 6A, 6B, which are placed at an upper side and a lower side, respectively, in the vertical direction V, are respectively installed to upper and lower recesses (a pair of recesses) 53, which are placed one after another in the vertical direction V at the lower end portion 511 of the hopper 5. A passage forming hole 61, which forms a portion of the accumulation passage 51, is formed in each of the shutters 6A, 6B. A shape of a cross section of the passage forming hole 61 coincides with the shape of the cross section of the accumulation passage 51. Each shutter 6A, 6B is constructed to slide in the corresponding recess 53 of the hopper 5 in a horizontal direction that is perpendicular to the vertical direction V. Each shutter 6A, 6B is slidable between an opening position 601 and a closing position 602. When the shutter 6A, 6B is placed into the opening position 601, a center of the passage forming hole 61 of the shutter 6A, 6B coincides with a center of the accumulation passage 51 such that the passage forming hole 61 forms a portion of the accumulation passage 51. In contrast, when the shutter 6A, 6B is placed into the closing position 602, the center of the passage forming hole 61 is displaced from the center of the accumulation passage 51 such that the shutter 6A, 6B closes the accumulation passage 51. Each shutter 6A, 6B is driven by an actuator to slide between the opening position 601 and the closing position 602.

The powder material 8, which is placed in the passage forming hole 61 of each shutter 6A, 6B, is moved in the corresponding recess 53 of the hopper 5 in response to the slide movement of the shutter 6A, 6B. Therefore, the movement of the powder material 8 can be reduced by minimizing the thickness of each shutter 6A, 6B.

Furthermore, as shown in FIGS. 1 and 2, when the upper and lower shutters 6A, 6B are in the closing position 602, a portion of the accumulation passage 51 is partitioned in the passage forming direction (the extending direction) of the accumulation passage 51 between the upper shutter 6A and the lower shutter 6B to form a measuring passage portion 52, which has a predetermined volume. That is, the upper shutter 6A and the lower shutter 6B partition the portion of the accumulation passage 51 into the measuring passage portion 52 in such a manner that the portion of the accumulation passage 51 is cut from the rest of the accumulation passage 51 in the passage forming direction (the extending direction) of the accumulation passage 51. A generally predetermined mass of powder material 8 to be supplied to the supply passage 31 of the feeder 3 is measured with the measuring passage portion 52. After the generally predetermined mass of powder material 8 is measured in the measuring passage portion 52 upon placing the upper and lower shutters 6A, 6B into the closing position 602, the lower shutter 6B is slide from the closing position 602 to the opening position 601. Thereby, the generally predetermined mass of powder material 8 in the measuring passage portion 52 is flown down into the supply passage 31 of the feeder 3. The generally predetermined mass of powder material 8, which is measured with the measuring passage portion 52, is supplied from the accumulation passage 51 into the supply passage 31 of the feeder 3.

The volume of the measuring passage portion 52 can be set to be equal to the volume of the cavity 211 formed in the molding hole 21. In other words, the amount of powder material 8, which is measured with the measuring passage portion 52, can be set to be equal to the amount of powder material 8, which is supplied into the cavity 211 per molding.

Furthermore, as discussed above, the inner diameter of the measuring passage portion 52 and the inner diameter of the molding hole 21 are equal to each other within the predetermined tolerable error range. Therefore, the height of the measuring passage portion 52 (i.e., a distance between an inner surface of the upper shutter 6A and an inner surface of the lower shutter 6B) is the same as the height of the cavity 211 formed in the molding hole 21 within a predetermined tolerable error range.

Figure 11:
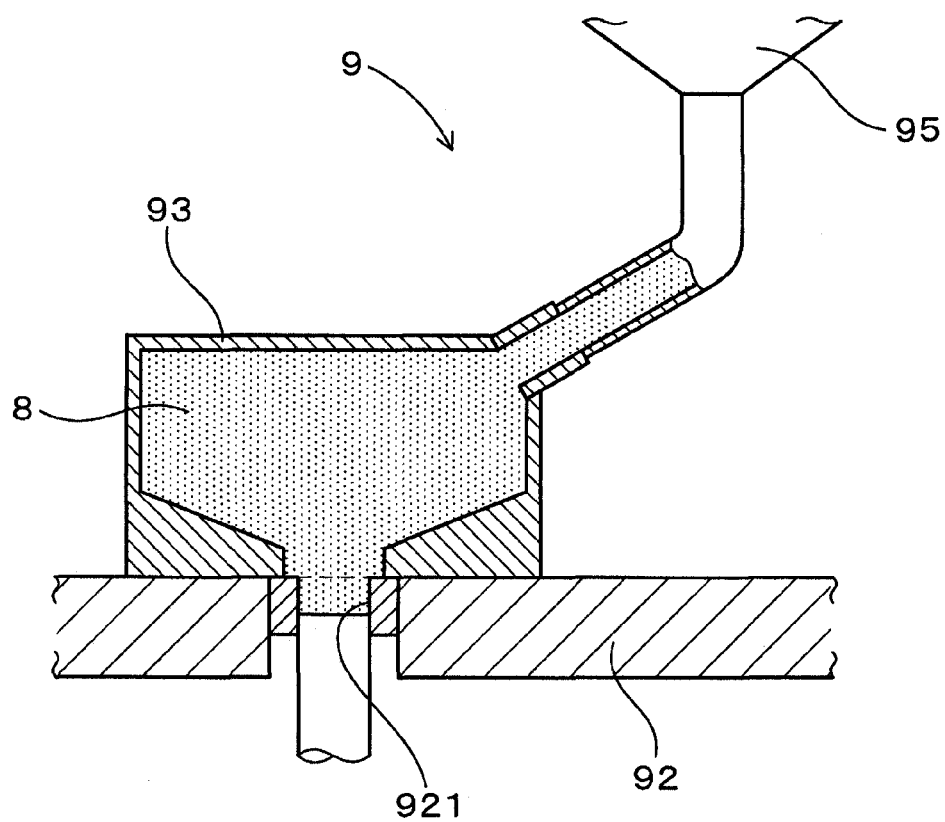
FIG. 11 is a cross sectional view of a previously proposed powder supply apparatus.

As shown in FIG. 11, a previously proposed powder supply apparatus 9 has the following characteristics. Specifically, in a case where the amount of powder material 8 accumulated in the hopper 95 is large, the weight, which is applied from the powder material 8 in the hopper 95 to the powder material 8 in the feeder 93, becomes large. Thereby, the bulk density of the powder material 8, which is supplied from the feeder 93 to the molding hole 921 of the die 92, becomes large. In contrast, in a case where the amount of powder material 8 accumulated in the hopper 95 becomes small, the weight, which is applied from the powder material 8 in the hopper 95 to the powder material 8 in the feeder 93, becomes small. Thereby, the bulk density of the powder material 8, which is supplied from the feeder 93 to the molding hole 921 of the die 92, becomes small.

In contrast, in the powder supply apparatus 1 of the present embodiment, the feeder 3 and the hopper 5 are formed separately from each other, and the measuring passage portion 52 is formed with the upper and lower shutters 6A, 6B in the hopper 5. The generally predetermined mass of powder material 8, which is measured with the measuring passage portion 52, is sequentially supplied from the accumulation passage 51 of the hopper 5 into the supply passage 31 of the feeder 3. Thereby, even in the case where the amount of powder material 8 accumulated in the accumulation passage 51 of the hopper 5 changes, the predetermined amount (regulated amount) of powder material 8 can be retained in the supply passage 31 of the feeder 3.

Furthermore, at the time of repeatedly supplying the powder material 8 from the supply passage 31 to the molding hole 21, the amount of change in the weight of the powder material 8 exerted to itself can be minimized. Thereby, it is possible to limit occurrence of a change in the bulk density of the powder material 8, which is supplied from the feeder 3 to the molding hole 21 of the die 2, between one molding operation and the next molding operation. Therefore, it is possible to limit occurrence of variations in the thickness of the powder molded product 81, which is molded from the powder material 8, among the powder molded products 81.

Figure 4:
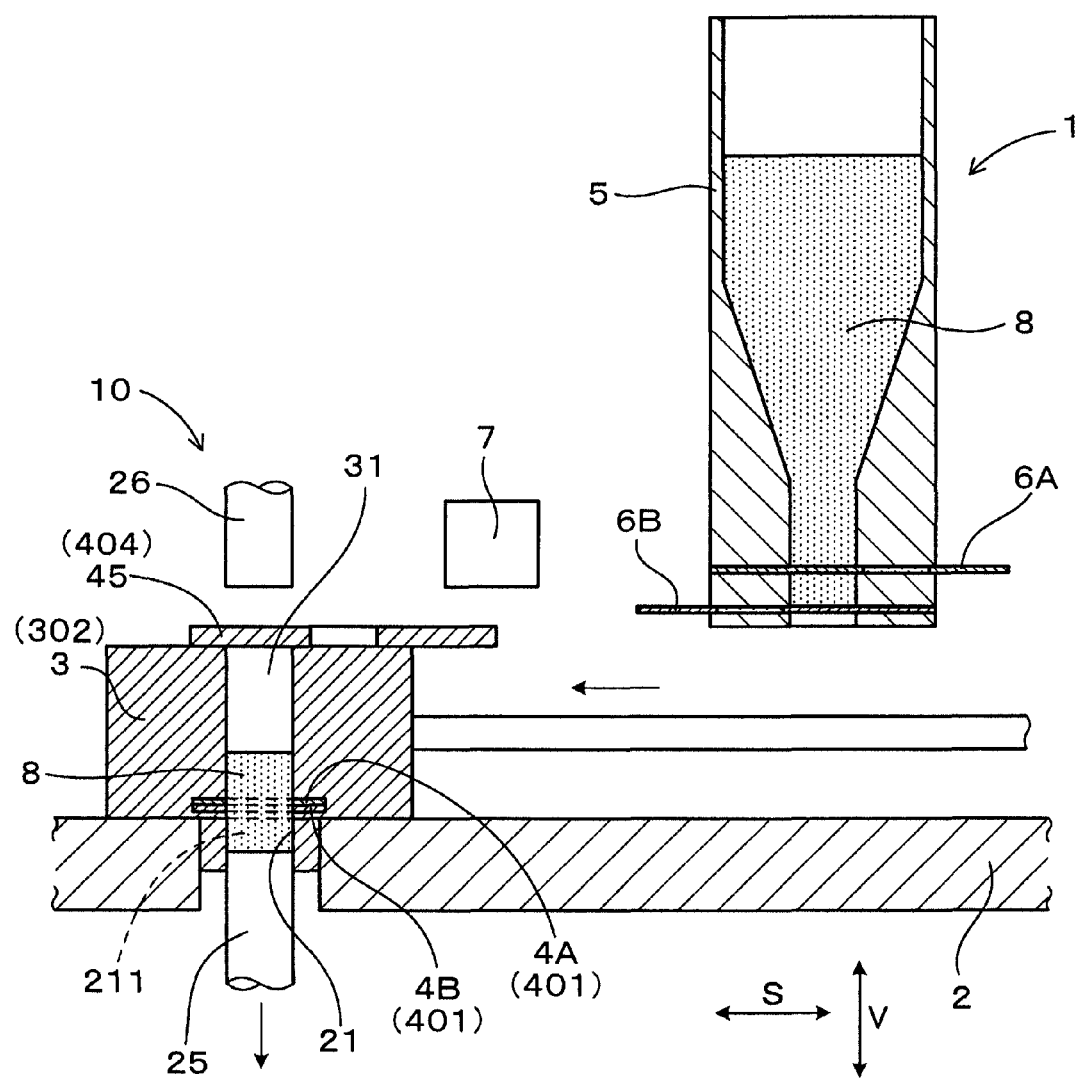
FIG. 4 is a cross sectional view of the powder supply apparatus of the embodiment seen in the direction perpendicular to the sliding direction of the feeder, indicating the feeder being opposed to an upper portion of a molding hole.
Figure 5:
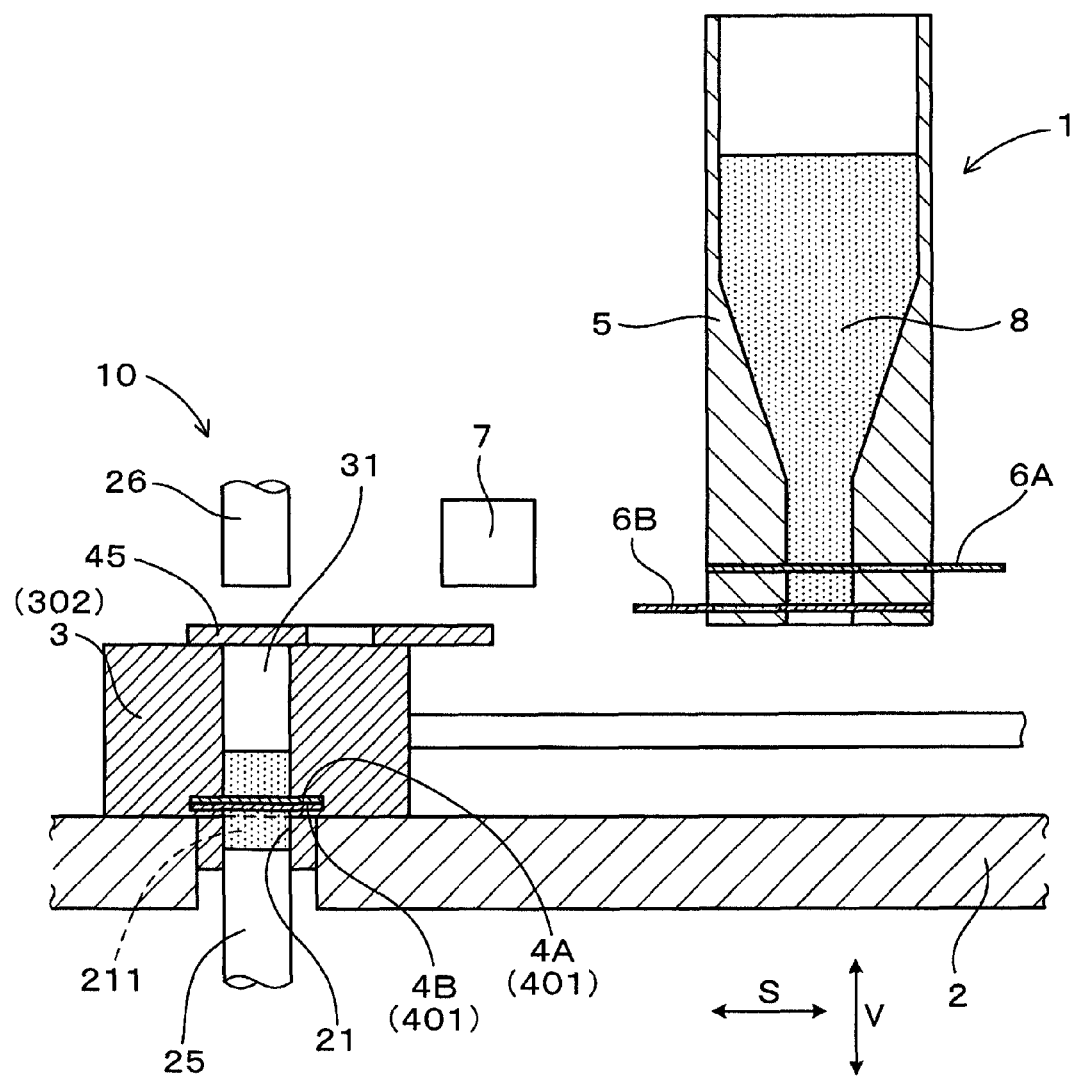
FIG. 5 is a cross sectional view of the powder supply apparatus of the embodiment seen in the direction perpendicular to the sliding direction of the feeder, indicating a state where powder material is leveled (scraped) by a pair of slidable leveling plates (scraping plates) of the feeder.

As shown in FIGS. 2 and 4, the feeder 3 is linearly slidable in the horizontal direction between a receiving position 301, at which the feeder 3 is placed below the hopper 5 and is opposed to the hopper 5, and a supplying position 302, at which the feeder 3 is placed at the location above the molding hole 21 and is opposed to the molding hole 21. The receiving position 301 is one example of a retreated position, at which the feeder 3 is retreated from the location above the molding hole 21. The feeder 3 is driven by an actuator (e.g., a cylinder or an electric motor) to slide between the receiving position 301 and the supplying position 302. The feeder 3 receives the powder material 8 from the hopper 5 at the receiving position 301, and the feeder 3 supplies the powder material 8 to the molding hole 21 at the supplying position 302.

Figure 6:
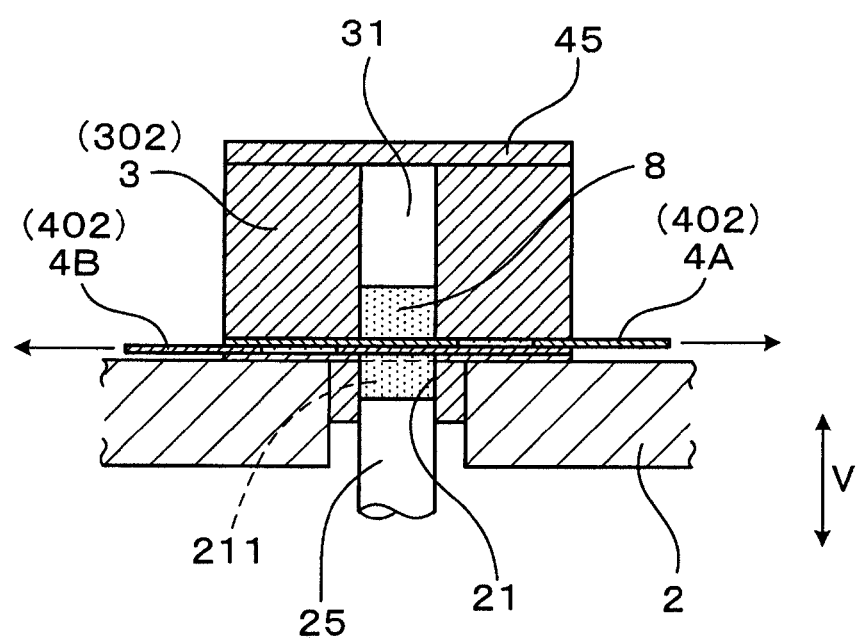
FIG. 6 is a cross sectional view of the powder supply apparatus of the embodiment seen in the sliding direction of the feeder, indicating the state where the powder material is leveled by the pair of slidable leveling plates of the feeder.
Figure 7:
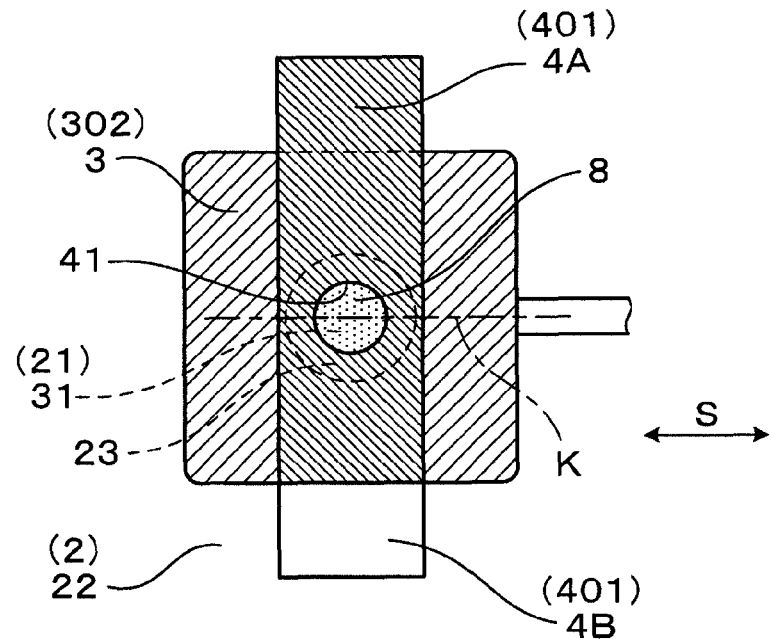
FIG. 7 is a cross sectional view showing the pair of slidable leveling plates seen from an upper side thereof indicating a state before the leveling of the powder material.
Figure 8:
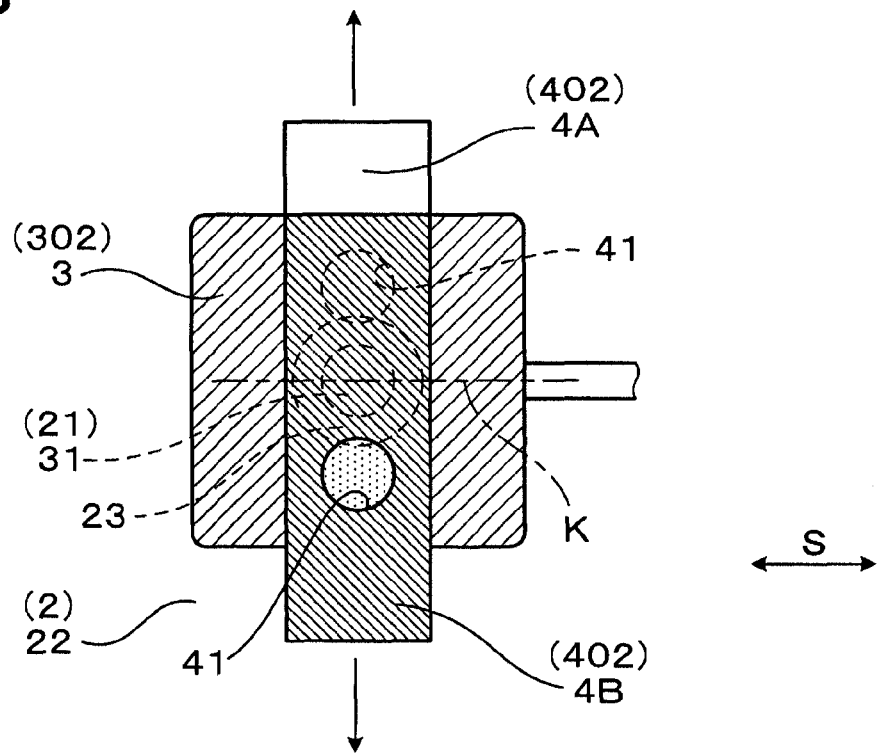
FIG. 8 is a cross sectional view showing the pair of slidable leveling plates seen from an upper side thereof indicating a state after the leveling of the powder material.

As shown in FIGS. 1, 2 and 6 to 8, upper and lower slidable leveling plates (a pair of slidable leveling plates) 4A, 4B, which are placed at an upper side and a lower side, respectively, in the vertical direction V to overlap with each other in a positioning recess 32 formed at a lower portion of the feeder 3. The upper and lower slidable leveling plates 4A, 4B may be also referred to as upper and lower slidable scraping plates. A passage forming hole 41, which forms a portion of the supply passage 31, is formed in each of the slidable leveling plates 4A, 4B. A shape of a cross section of the passage forming hole 41 coincides with the shape of the cross section of the supply passage 31. Each slidable leveling plate 4A, 4B is constructed to slide in the positioning recess 32 of the feeder 3 in the horizontal direction that is perpendicular to the vertical direction V. Each slidable leveling plate 4A, 4B is slidable between an opening position 401 and a closing position 402. As shown in FIG. 7, when the slidable leveling plate 4A, 4B is placed into the opening position 401, a center of the passage forming hole 41 of the slidable leveling plate 4A, 4B coincides with a center of the supply passage 31 such that the passage forming hole 41 forms a portion of the supply passage 31. In contrast, as shown in FIGS. 6 and 8, when the slidable leveling plate 4A, 4B is placed into the closing position 402, the center of the passage forming hole 41 is displaced from the center of the supply passage 31 such that the slidable leveling plate 4A, 4B closes the supply passage 31. Each slidable leveling plate 4A, 4B is driven by an actuator to slide between the opening position 401 and the closing position 402.

As shown in FIGS. 1, 2 and 4, a closing plate 45 is installed to an upper surface of the feeder 3. The closing plate 45 closes an upper opening of the supply passage 31 of the feeder 3 at the time of sliding the feeder 3 from the receiving position 301 to the supplying position 302. A through hole 451, which has an inner diameter that is the same as that of the supply passage 31, is formed in the closing plate 45. The closing plate 45 is slidable between a communicating position 403 and a closing position 404. As shown in FIGS. 1 and 2, when the closing plate 45 is placed into the communicating position 403, the through hole 451 of the closing plate 45 is communicated with the supply passage 31. In contrast, as shown in FIG. 4, when the closing plate 45 is placed into the closing position 404, the closing plate 45 closes the upper opening of the supply passage 31.

By using the closing plate 45, it is possible to limit intrusion of foreign objects (debris, dust or the like) from an upper side into the supply passage 31 of the feeder 3 at the time of sliding the feeder 3 from the receiving position 301 to the supplying position 302.

Figure 9:
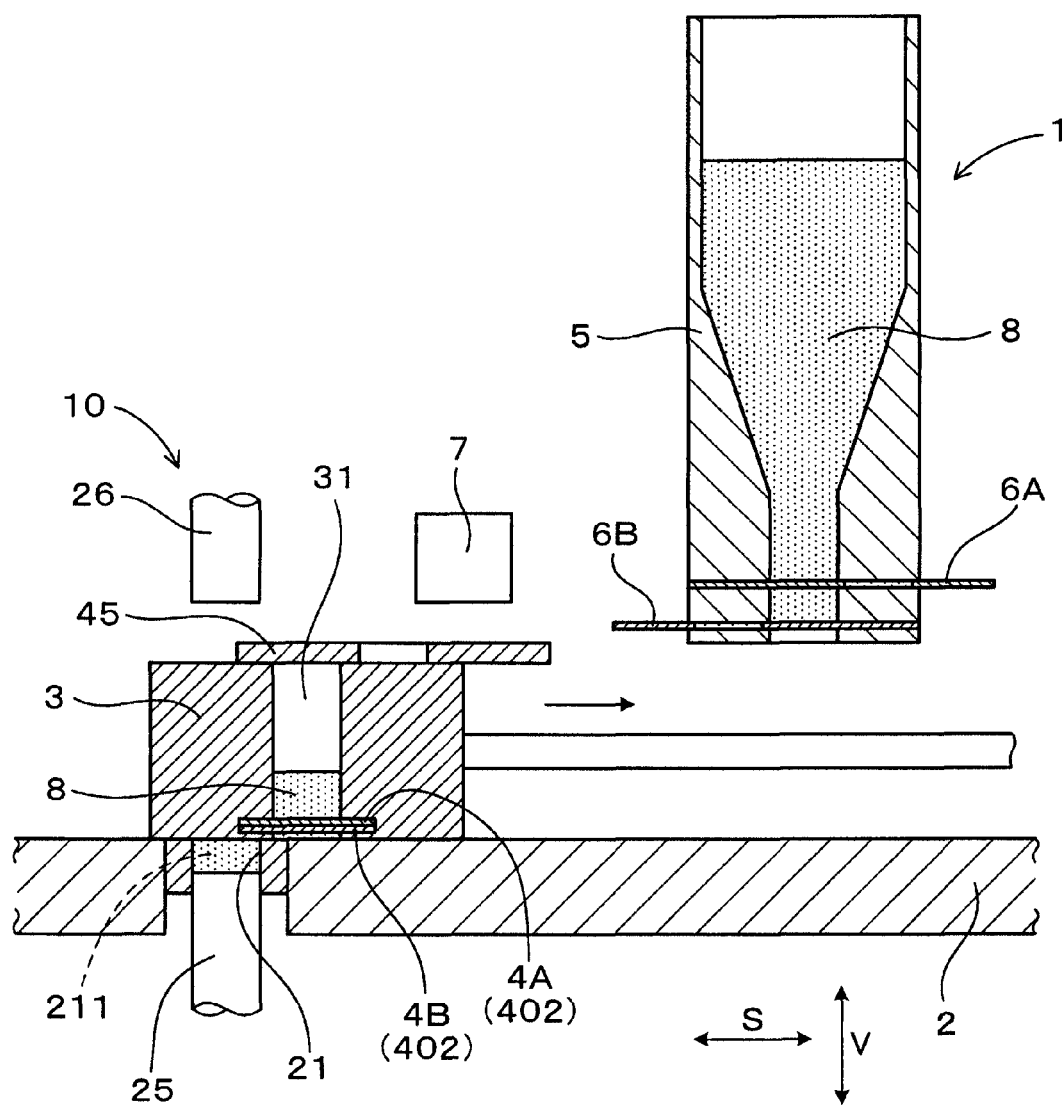
FIG. 9 is a cross sectional view of the powder supply apparatus of the embodiment seen in the direction perpendicular to the sliding direction of the feeder, indicating a state where the powder material is leveled.

As shown in FIGS. 7 and 8, the upper and lower slidable leveling plates 4A, 4B are respectively slidable toward opposite sides, which are opposite to each other, relative to an imaginary line K that extends through the center of the supply passage 31 in the sliding direction S of the feeder 3. When each of the slidable leveling plates 4A, 4B is slid from the opening position 401 to the closing position 402, the powder material 8, which is received in the supply passage 31, is cut off and is thereby leveled by each of the slidable leveling plates 4A, 4B. Furthermore, as shown in FIG. 9, when the feeder 3 is returned from the supplying position 302 to the receiving position 301, the powder material 8 received in the cavity 211 of the molding hole 21 is cut off and is thereby leveled by the feeder 3.

The upper and lower slidable leveling plates 4A, 4B are slidable in two opposite horizontal directions (two opposite sliding directions), respectively, which are perpendicular to the sliding direction S of the feeder 3, toward opposite sides relative to the imaginary line K. The powder material 8, which is supplied to the molding hole 21 of the die 2, is cut off (and is thereby leveled) in the three directions, i.e., the sliding direction S of the feeder 3 and the two opposite sliding directions of the upper and lower slidable leveling plates 4A, 4B. Alternatively, the upper and lower slidable leveling plates 4A, 4B may be slid in two opposite horizontal directions, respectively, which extend along an imaginary line that is angled relative to the sliding direction S of the feeder 3 by a predetermined tilt angle. Further alternatively, for instance, the upper and lower slidable leveling plates 4A, 4B may be slid in two opposite horizontal directions, respectively, which are displaced from each other by, for example, 120 degrees.

Furthermore, instead of providing the two slidable leveling plates 4A, 4B, it is possible to provide only a single slidable leveling plate that is slidable in an opposite direction, which is opposite from the sliding direction of the feeder 3 at the time of retreating the feeder 3 away from the location above the molding hole 21.

Furthermore, in addition to the two slidable leveling plates 4A, 4B, which are slidable toward the opposite sides, respectively, it is possible to provide an additional slidable leveling plate that is slidable in an opposite direction, which is opposite from the sliding direction of the feeder 3 at the time of retreating the feeder 3 away from the location above the molding hole 21.

The positioning recess 32 of the lower portion of the feeder 3 is formed at a location that is slightly spaced from the lower surface (bottom surface) of the feeder 3 toward the upper side. The lower slidable leveling plate 4B is placed such that the lower slidable leveling plate 4B does not directly contact the lower surface of the feeder 3.

The powder material 8, which is placed in the passage forming hole 41 of each of the slidable leveling plates 4A, 4B, is moved in the positioning recess 32 of the feeder 3 in response to the slide movement of the slidable leveling plates 4A, 4B. Therefore, the movement of the powder material 8 can be reduced by minimizing the thickness of each slidable leveling plate 4A, 4B.

As shown in FIG. 11, in the previously proposed powder supply apparatus 9, the powder material 8, which is flown down into the molding hole 921, is cut off and is thereby leveled only by the retreating movement of the feeder 93 away from the location above the molding hole 921. Therefore, in the molding hole 921, a bulk density of a part of the powder material 8 located at a side, toward which the feeder 93 is slid to level the powder material 8, is increased in comparison to the bulk density of a peripheral part of the powder material 8, which is located at a periphery of the above-described part of the powder material 8.

In the powder supply apparatus 1 of the present embodiment, the powder material 8 is leveled not only by the feeder 3 but also by the two slidable leveling plates 4A, 4B, which are slid in the different directions (different cutting directions) that are different form the sliding direction (cutting direction) of the feeder 3. That is, in addition to the leveling of the powder material 8 with the feeder 3, the powder material 8 is leveled by the two slidable leveling plates 4A, 4B. Therefore, the powder material 8, which is in the supply passage 31 or the molding hole 21, is cut (leveled) in the three different directions, which are different from each other.

In this way, in the cavity 211 formed in the molding hole 21, the part of the powder material 8, which has the increased bulk density, can be spread in the horizontal direction(s). Therefore, it is possible to limit generation of the bulk density bias at the respective circumferential parts of the powder material 8 filled in the cavity 211.

Figure 3:
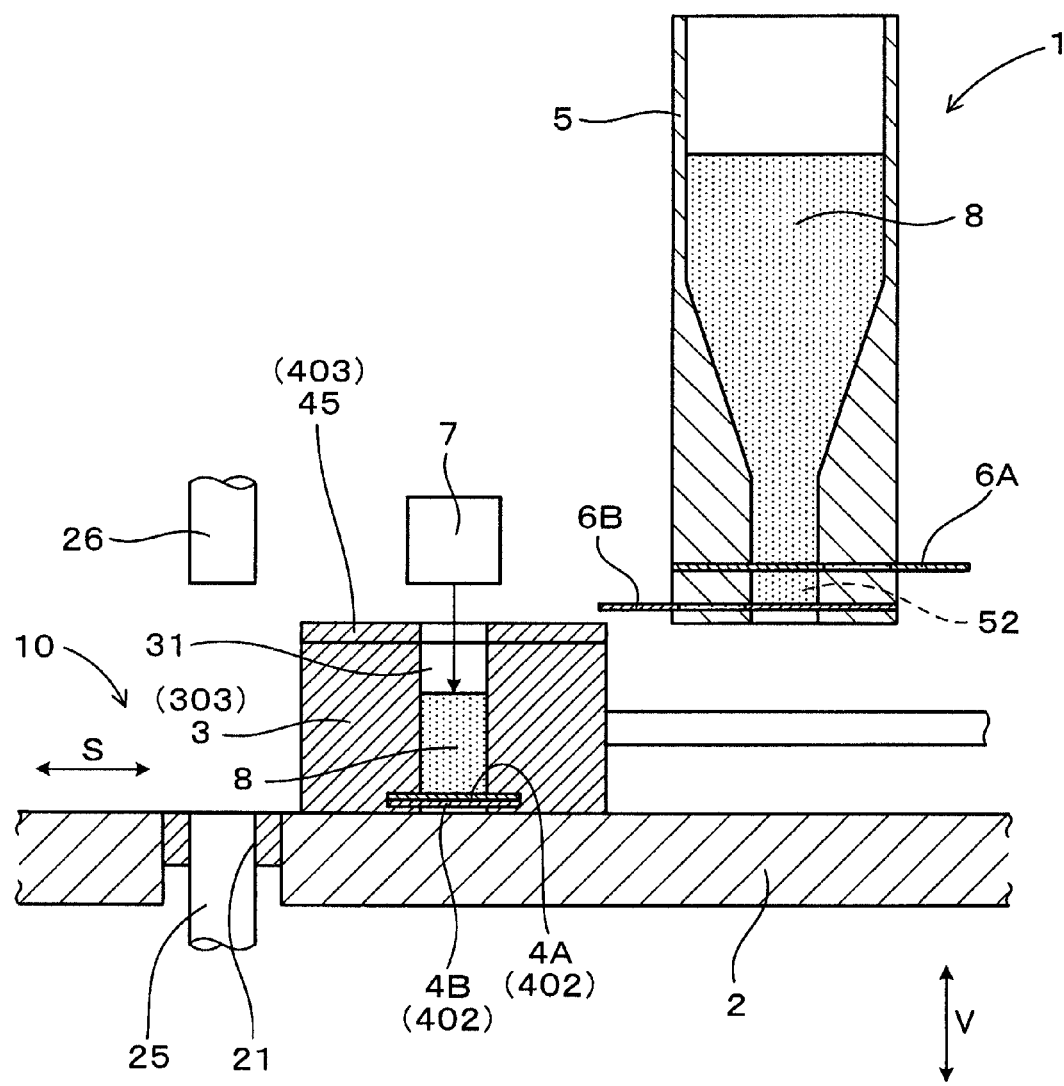
FIG. 3 is a cross sectional view of the powder supply apparatus of the embodiment seen in the direction perpendicular to the sliding direction of the feeder, indicating the feeder being opposed to a lower portion of a sensor.

Furthermore, as shown in FIG. 3, the powder supply apparatus 1 of the present embodiment includes a sensor 7 that senses presence of the powder material 8 in the supply passage 31. The sensor 7 is installed to the die 2, the hopper 5 or a frame of the powder supply apparatus 1. A distance between the sensor 7 and the upper surface of the die 2 is kept constant. The sensor 7 senses a height of a surface of the powder material 8 placed in the supply passage 31 of the feeder 3.

The sensor 7 is opposable to the feeder 3 in the middle of the sliding path of the feeder 3, which is slidable between the receiving position 301 and the supplying position 302. The feeder 3 can be stopped in an intermediate position 303, at which the feeder 3 is opposed to the sensor 7, between the receiving position 301 and the supplying position 302. As shown in FIG. 2, the feeder 3 (more specifically, the supply passage 31 of the feeder 3) receives the powder material 8 from the hopper 5 at the receiving position 301. Furthermore, as shown in FIG. 3, the sensor 7 senses the amount of powder material 8 in the supply passage 31 of the feeder 3 when the feeder 3 is placed in the intermediate position 303. Also, as shown in FIG. 4, the feeder 3 supplies the powder material 8 from the supply passage 31 to the molding hole 21 at the supplying position 302.

The sensor 7 of the present embodiment is a laser distance sensor that can sense a distance from the sensor to a measurement subject through irradiation of a laser light to the measurement subject and reflection of the laser light from the measurement subject. The sensor 7 is configured to sense a height location of the top surface of the powder material 8 in the supply passage 31 to sense whether the powder material 8, which is measured with the measuring passage portion 52 of the hopper 5 and is within a predetermined range of mass, is present in the supply passage 31. The sensor 7 of the present embodiment should not be limited to the laser distance sensor. That is, the sensor 7 may be any one of various contactless sensors that can sense the distance from the sensor 7 to the measurement subject.

By using the sensor 7, it is possible to check whether the supply passage 31 of the feeder 3 holds the predetermined amount (predetermined mass) of powder material 8 that is a sum of the amounts (masses) of powder material 8, which are measured by the measuring passage portion 52 through a plurality of measurements, respectively. In other words, by using the sensor 7, a change in the mass of the powder material 8 held in the supply passage 31 can be kept within a tolerable error range, which serves as a predetermined range. This tolerable error range may be a range of mass of powder material, which is measured with the measuring passage portion 52 per measurement. Furthermore, at the time of repeatedly supplying the powder material 8 from the supply passage 31 to the molding hole 21, it should be ensured that the powder material 8 in the tolerable error range is always held in the supply passage 31. In this way, a change in the mass of powder material 8 in the supply passage 31 is minimized, and thereby it is easy to implement the state where the bulk density of the powder material 8, which is supplied from the feeder 3 to the molding hole 21 of the die 2, does not substantially change between one molding operation and the next molding operation.

A tolerable error range, which is set at the sensor 7, is set to be a range of change in the height location of the top surface of the powder material 8 in the supply passage 31, which takes place per measurement with the measuring passage portion 52. This range of change in the height location of the top surface of the powder material 8 can be a range of difference between a height location of the top surface of the powder material 8 that is accumulated in the supply passage 31 through a total of six measurements of powder material 8 with the measuring passage portion 52, and a height location of the top surface of the powder material 8 that is accumulated in the supply passage 31 through a total of seven measurements of powder material 8 with the measuring passage portion 52.

The feeder 3 is constructed as follows. That is, after the sensor 7 senses that the powder material 8 within the predetermined range of mass is present in the supply passage 31, the feeder 3 is slid from the receiving position 301 to the supplying position 302, and the feeder 3 supplies the predetermined amount of powder material 8 from the supply passage 31 into the molding hole 21. When the feeder 3 is slid from the receiving position 301 to the supplying position 302, the supply passage 31 of the feeder 3 always holds the powder material 8 that shows a change in the mass of powder material 8 kept in the tolerable error range.

The actuator, which drives the die 2 to upwardly lift the die 2 relative to the lower punch 25, the actuator, which drives the feeder 3 to slide the feeder 3, the actuators, which drive the upper and lower shutters 6A, 6B, respectively, to slide the upper and lower shutters 6A, 6B, and the actuators, which drive the upper and lower slidable leveling plates 4A, 4B, respectively, to slide the upper and lower slidable leveling plates 4A, 4B are controlled by a control device that controls the powder supply apparatus 1 and the powder molding apparatus 10. The operations of the powder supply apparatus 1 is executed according to a control program stored in the control device.

Next, a method of supplying the powder material 8 into the molding hole 21 of the die 2 by the powder supply apparatus 1 and a method of molding the powder molded product 81 from the powder material 8 by the powder molding apparatus 10 will be described.

First of all, as shown in FIG. 2, the control device places the lower shutter 6B into the closing position 602 and the upper shutter 6A into the opening position 601, so that the powder material 8 is flown down into the lower end portion 511 of the accumulation passage 51. Then, the control device drives the shutter 6A from the opening position 601 to the closing position 602 to measure the predetermined mass of powder material 8 in the measuring passage portion 52. Furthermore, the control device slides the feeder 3 to the receiving position 301, so that the feeder 3 is placed below the hopper 5.

Next, the control device slides the shutter 6B from the closing position 602 to the opening position 601 in the state where the upper and lower slidable leveling plates 4A, 4B of the feeder 3 are placed into the closing position 402. At this time, the predetermined mass of powder material 8, which is measured in the measuring passage portion 52, is flown down into the supply passage 31 of the feeder 3, so that the powder material 8 is accumulated on the upper slidable leveling plate 4A. The control device repeats each of the measuring process of measuring the predetermined mass of powder material 8 in the measuring passage portion 52 and the flowing process of flowing down the predetermined mass of powder material 8 into the supply passage 31 of the feeder 3 for a predetermined number of times.

Thereafter, as shown in FIG. 3, the control device slides the feeder 3 from the receiving position 301 to the intermediate position 303, so that the feeder 3 is placed below the sensor 7. Then, the control device measures the height location of the top surface of the powder material 8 received in the supply passage 31 of the feeder 3 with the sensor 7 and senses (determines) whether the powder material 8 within the predetermined range of mass is present in the supply passage 31. When it is sensed that the powder material 8 within the predetermined range of mass is present in the supply passage 31, the control device slides the feeder 3 from the intermediate position 303 to the supplying position 302.

Thereafter, as shown in FIG. 4, the control device simultaneously slides each of the upper and lower slidable leveling plates 4A, 4B of the feeder 3 from the closing position 402 to the opening position 401, so that the upper and lower slidable leveling plates 4A, 4B are slid toward the opposite sides, respectively, and thereby the supply passage 31, which receives the powder material, is opened at the location above the molding hole 21.

Next, the control device upwardly lifts the die 2 relative to the lower punch 25. At this time, the powder material 8, which is received in the supply passage 31 of the feeder 3, is flown down into the molding hole 21, so that the cavity 211 of a predetermined volume filled with the powder material 8 is formed in the molding hole 21 of the die 2. Alternative to the above process, the control device may slide each of the upper and lower slidable leveling plates 4A, 4B from the closing position 402 to the opening position 401 after upwardly lifting the die 2 relative to the lower punch 25.

Thereafter, as shown in FIGS. 5 to 8, the control device slides the upper and lower slidable leveling plates 4A, 4B of the feeder 3 toward the opposite sides, respectively, from the opening position 401 to the closing position 402. In this way, the powder material 8, which is received in the supply passage 31 of the feeder 3, is cut off and is thereby leveled with the respective slidable leveling plates 4A, 4B. Thereafter, as shown in FIG. 9, the control device slides the feeder 3 from the supplying position 302 to the receiving position 301. At this time, the powder material 8 in the cavity 211 is cut off and is thereby leveled with the feeder 3, and the filling of the powder material 8 into the cavity 211 is completed.

Next, as shown in FIG. 10, the control device lowers the upper punch 26 toward the lower punch 25. When the upper punch 26 is lowered to a predetermined position, the powder material 8 in the cavity 211 is clamped, i.e., is held between the lower punch 25 and the upper punch 26. At this time, the powder material 8 is compression molded, so that the powder molded product 81 is molded. Then, the control device upwardly lifts the upper punch 26 to retreat the upper punch from the molding hole 21, and the control device lowers the die 2 relative to the lower punch 25. In this way, the powder molded product 81 in the molding hole 21 is removed. Thereafter, the powder molded product 81 is sintered to form the final product.

Here, it should be noted that a shaft member 82 (see FIG. 10) to be insert molded in the powder molded product 81 can be optionally held in the upper punch 26. In this case, the powder molded product 81, which has the shaft member 82 placed in a center portion of the powder molded product 81, is molded.

In the present embodiment, a first arrangement of coinciding the shape of the cross section of the lower end portion 511 of the accumulation passage 51 of the hopper 5, the shape of the cross section of the supply passage 31 of the feeder 3, and the shape of the cross section of the molding hole 21 of the die 2 relative to each other within the predetermined tolerable error range, a second arrangement of proving the upper and lower shutters 6A, 6B to the hopper 5, which is separated from the feeder 3, a third arrangement of measuring the amount of powder material 8 received in the supply passage 31 with the sensor 7, and a fourth arrangement of providing the upper and lower slidable leveling plates 4A, 4B to the feeder 3 are implemented in the single embodiment. Alternatively, these arrangements can be implemented separately.

For example, the powder supply apparatus 1, which includes only the first arrangement, may be formed. Alternatively, the powder supply apparatus 1, which includes the first and second arrangements, may be formed. Further alternatively, the powder supply apparatus 1, which includes the first to third arrangements, may be formed. Further alternatively, the powder supply apparatus 1, which includes the first and fourth arrangements, may be formed.

Furthermore, the present disclosure should not be limited to the above embodiment and may be implemented by various other embodiments without departing from the scope of the present disclosure.

(Validation Test)

In a validation test, thicknesses of the powder molded product 81, which is compact molded under a constant pressure with the powder molding apparatus 10 (hereinafter, referred to as a test powder molding apparatus or simply referred to as a test apparatus) including the powder supply apparatus 1 described above, are measured. For the comparative purpose, thicknesses of the powder molded product 81, which is compact molded under the constant pressure with a powder molding apparatus (hereinafter referred to as a comparative powder molding apparatus or simply referred to as a comparative apparatus) of a comparative example including the powder supply apparatus 9 of FIG. 11 that does not have the first to fourth arrangements, are measured.

The powder material 8, which is used in the molding operation of the validation test, is Fe—Si metal powder that has an average particle size of 80 µm. Furthermore, a target outer diameter of the powder molded product 81, which is shaped into the circular disk form, is 10 mm (i.e., φ 10 mm), and a target thickness of the powder molded product 81 is 2.2 mm. Furthermore, the shaft member 82, which has an outer diameter of 3.6 mm (i.e., φ 3.6 mm), is insert molded in the center portion of the powder molded product 81 (see FIG. 10). Furthermore, a total of eighty powder molded products 81 are molded at the powder supply apparatus 1, 9 of each of the test powder molding apparatus and the comparative powder molding apparatus.

The thickness of the circular disk portion 811 of the powder molded product 81 is measured at each of eight measurement locations (i.e., each of eight circumferential parts), which are arranged one after another at equal intervals in the circumferential direction about a central axis of the powder molded product 81. A change in an average thickness value with respect to the number of times for executing molding and a variation in the thickness at the eight circumferential parts of the powder molded product 81 are checked.

FIGS. 12 to 15 indicate a result of the measurement of the thickness of the circular disk portion 811 of the powder molded product 81 for the test powder molding apparatus (indicated as "TEST APPAR" in the drawings) and the comparative powder molding apparatus (indicated as "COMPARATIVE APPAR" in the drawings).

Figure 12:
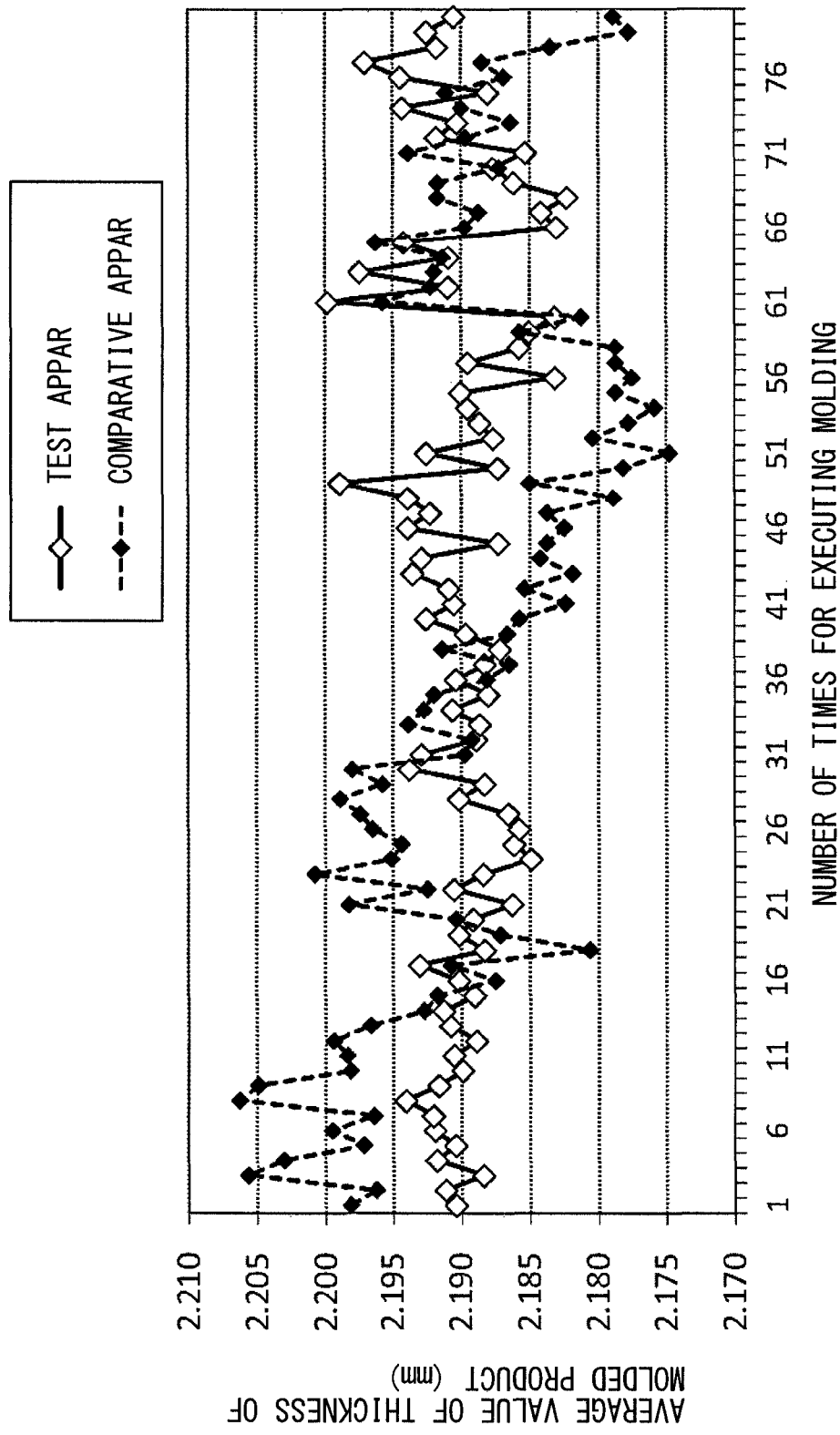
FIG. 12 is a graph indicating a relationship between the number of times for executing molding of a powder molded product and an average value (mm) of a thicknesses measured at eight locations along a circular disk portion of a powder molded product for a test apparatus and a comparative apparatus in a validation test.

FIG. 12 indicates a relationship between the number of times for executing molding of the powder molded product 81 and the average value (mm) of the thicknesses measured at the eight circumferential parts of the circular disk portion 811 of the powder molded product 81 for each of the test powder molding apparatus (see a solid line) and the comparative powder molding apparatus (see a dotted line). As indicated in FIG. 12, in the case of the comparative powder molding apparatus, when the number of times for executing molding is increased from the 1st time to the 59th time, the average value of the thicknesses of the powder molded product 81 is reduced while showing some degree of fluctuations. This is probably due to that the amount of powder material 8 in the hopper 95 and the feeder 93 is progressively reduced in response to an increase in the number of times for executing molding, and thereby the weight, which is applied from the powder material 8 in the feeder 93 to the powder material 8 in the molding hole 21, is progressively reduced. Furthermore, when the number of times for executing molding reaches the 60th time, the powder material 8 is refilled into the hopper 95. Therefore, the average value of the thicknesses of the powder molded product 81 is once increased after the 60th time. This is probably due to that when the powder material 8 is refilled in the hopper 95, the weight, which is applied from the powder material 8 in the feeder 93 to the powder material 8 in the molding hole 21, is increased once again.

In contrast, in the case of the test powder molding apparatus, the decreasing of the average value of the thicknesses of the powder molded product 81 in response to the increase in the number of times for executing molding is not observed although there is some degree of fluctuation in the average value of the thicknesses of the powder molded product 81 from one molding time to the next molding time. In the case of the comparative powder molding apparatus, a difference between a maximum average value of the thicknesses of the powder molded product 81 and a minimum average value of the thickness of the powder molded product 81 is 31.5 µm. In contrast, in the case of the test powder molding apparatus, a difference between a maximum average value of the thicknesses of the powder molded product 81 and a minimum average value of the thickness of the powder molded product 81 is 17.5 µm. According to this result, it is understood that the first to third arrangements discussed above are effective in the test powder molding apparatus of the present embodiment, and thereby a substantial change in the average value of the thicknesses of the powder molded product 81 is less likely to occur in response to the increase in the number of times of molding of the powder molded product 81.

Figure 13:
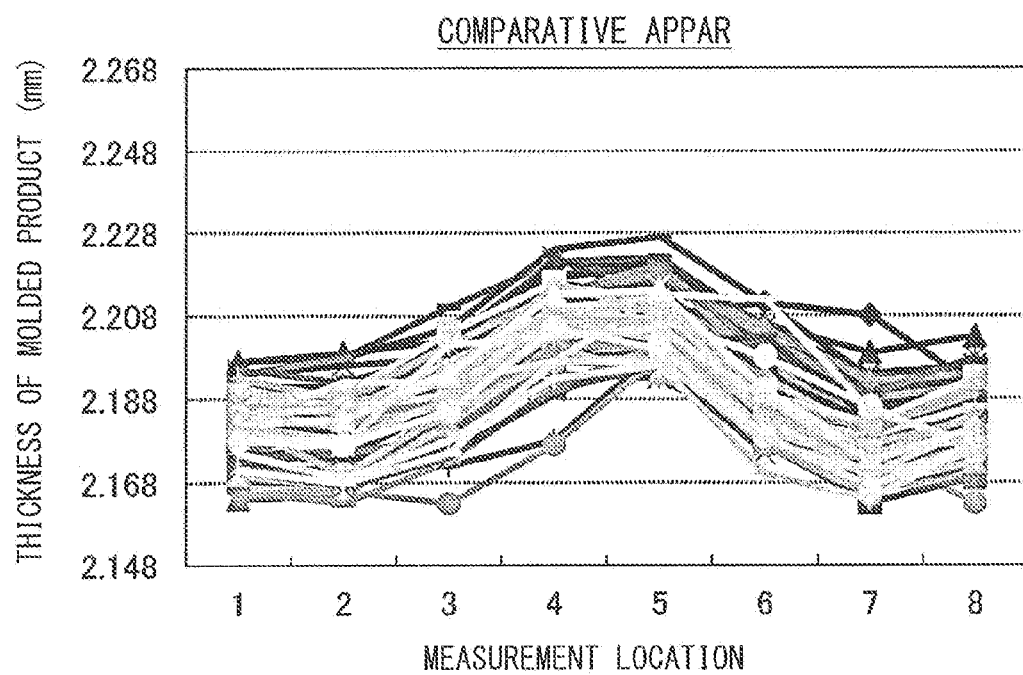
FIG. 13 is a graph indicating a thickness (mm) at eight measurement locations, which are located one after another in a circumferential direction along the circular disk portion of the powder molded product in the case of the comparative apparatus in the validation test.
Figure 14:
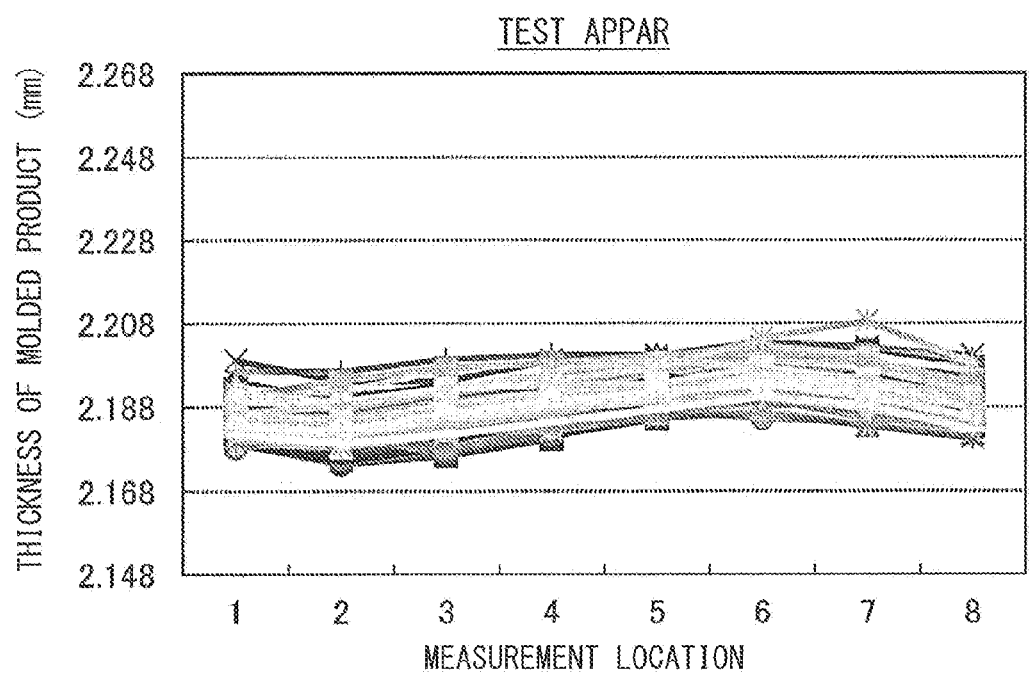
FIG. 14 is a graph indicating a thickness (mm) at eight measurement locations, which are located one after another in a circumferential direction along the circular disk portion of the powder molded product in the case of the test apparatus in the validation test.

FIG. 13 indicates a relationship between the eight circumferential measurement locations (the eight circumferential parts) of the circular disk portion 811 of the powder molded product 81 and the thickness (mm) of the circular disk portion 811 at each of the eight circumferential measurement locations in the comparative powder molding apparatus of the comparative example. FIG. 14 indicates a relationship between the eight circumferential measurement locations (the eight circumferential parts) of the circular disk portion 811 of the powder molded product 81 and the thickness (mm) of the circular disk portion 811 at each of the eight circumferential measurement locations in the test powder molding apparatus of the present embodiment.

As shown in FIG. 13, in the case of the comparative powder molding apparatus, the thickness at the 4th measurement location of the powder molded product 81 and the thickness at the 5th measurement location of the powder molded product 81 are relatively large. The 4th measurement location and the 5th measurement location are located on the side (the right side in FIG. 9), toward which the feeder 3 is slid to level (scrape) the powder material 8 received in the molding hole 21. Therefore, the thickness variations occur at the circumferential parts of the powder molded product 81 in response to the biasing of the scraping direction.

In contrast, as shown in FIG. 14, in the test powder molding apparatus of the present embodiment, the thicknesses of the 1st to 8th measurement locations of the powder molded product 81 do not show significant differences. In the test powder molding apparatus of the present embodiment, the effect of the fourth arrangement discussed above becomes prominent, so that the substantial thickness variations of the circumferential parts are less likely to occur.

Figure 15:
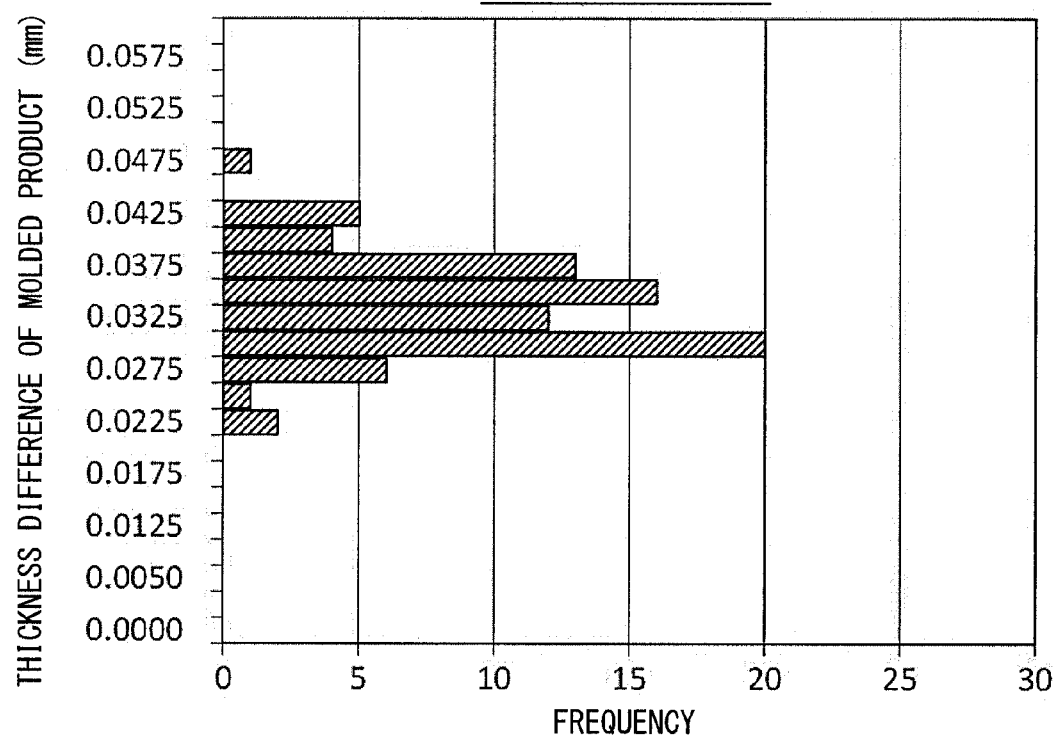
FIG. 15 is a graph indicating a difference between a maximum thickness value and a minimum thickness value at the eight measurement locations of the powder molded product in the case of the comparative apparatus in the validation test.

FIG. 15 shows a histogram, which is prepared based on the result shown in FIG. 13 of the comparative powder molding apparatus of the comparative example and indicates a distribution of a thickness difference (mm) between a maximum thickness value and a minimum thickness value at each of the eight measurement locations of each of the eighty powder molded products 81, which are respectively produced at eighty molding operations at the comparative powder molding apparatus. Furthermore, FIG. 16 shows a histogram, which is prepared based on the result shown in FIG. 14 of the test powder molding apparatus of the present embodiment and indicates a distribution of a thickness difference (mm) between a maximum thickness value and a minimum thickness value at each of the eight measurement locations of each of the eighty powder molded products 81, which are respectively produced at eighty molding operations at the test powder molding apparatus.

Figure 16:
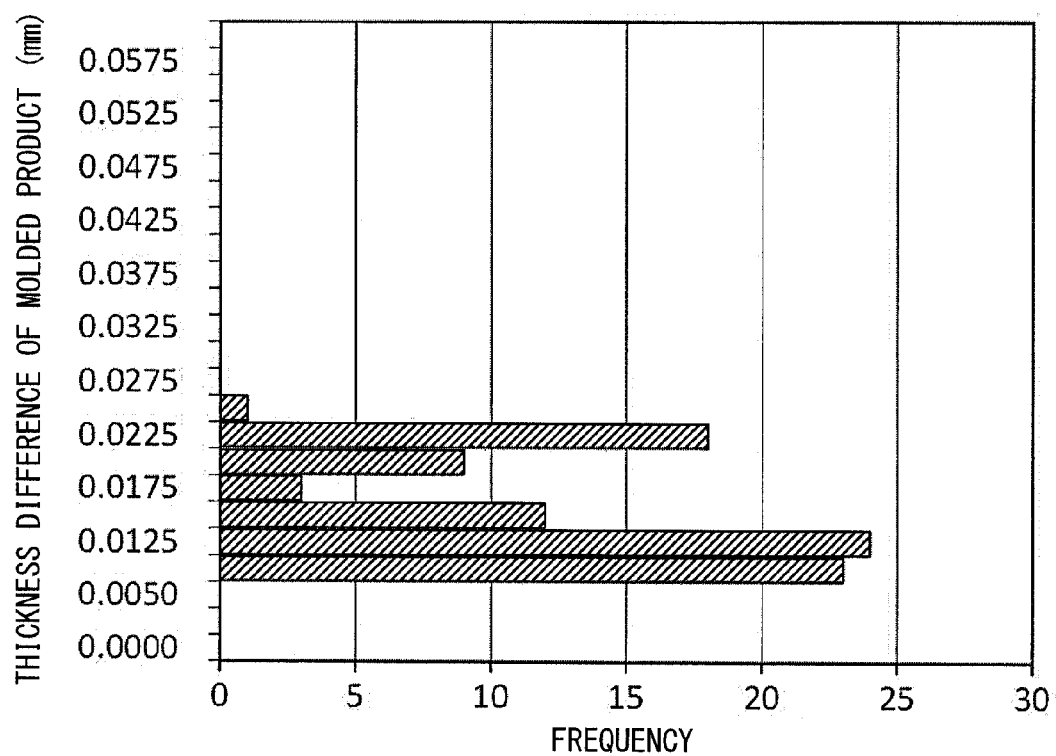
FIG. 16 is a graph indicating a difference between a maximum thickness value and a minimum thickness value at the eight measurement locations of the powder molded product in the case of the test apparatus in the validation test.

As shown in FIGS. 15 and 16, the distribution of the thickness differences in the case of the test powder molding apparatus is concentrated in the circumferential parts, at each of which the thickness difference is relatively small in comparison to the thickness difference in the case of the comparative powder molding apparatus. An average value of the thickness difference in the case of the comparative powder molding apparatus is 32.3 µm. In contrast, an average value of the thickness difference in the case of the test powder molding apparatus is 13.8 µm. Thereby, it is understood that in the case of the test powder molding apparatus, the variations in the thickness of the powder molded product are reduced by about 40% in average in comparison to that of the comparative powder molding apparatus.

What is claimed is:

1. A powder supply apparatus comprising
a feeder that has a supply passage, which supplies powder material to a molding hole of a die; and
a hopper that is formed separately from the feeder and has an accumulation passage, through which the powder material passes down into the supply passage, wherein:
the supply passage extends linearly in a vertical direction while a cross section of the supply passage is constant along an entire extent of the supply passage and has a size and a shape, which coincide with a size and a shape of a cross section of the molding hole that extends in the vertical direction;

at least a lower end portion of the accumulation passage extends in the vertical direction and has a cross section that has a size and a shape that coincide with the size and the shape of the cross section of the supply passage; and the feeder is slidable relative to the molding hole of the die in a direction that is perpendicular to the vertical direction.

2. The powder supply apparatus according to claim 1, wherein:

the hopper includes an upper shutter and a lower shutter that are placed at an upper side and a lower side, respectively, in the vertical direction to partition a portion of the accumulation passage into a measuring passage portion, which has a predetermined volume, in such a manner that the portion of the accumulation passage is cut from the rest of the accumulation passage in an extending direction of the accumulation passage; and the powder material, the amount of which is measured in the measuring passage portion, is supplied from the accumulation passage into the supply passage.

3. The powder supply apparatus according to claim 2, comprising a sensor that senses presence of the powder material in the supply passage, wherein:

the sensor senses whether the powder material, the amount of which is measured with the measuring passage portion and is in a predetermined range, is present in the supply passage; and the feeder is slid to a location above the molding hole and supplies the powder material from the supply passage into the molding hole after the sensor senses that the powder material, the amount of which is measured with the measuring passage portion and is in the predetermined range, is present in the supply passage.

4. The powder supply apparatus according to claim 1, wherein:

the feeder is linearly slidable between a retreated position, at which the feeder is retreated from a location above the molding hole, and a supplying position, at which the feeder is placed at the location above the molding hole and is opposed to the molding hole;

the feeder includes an upper slidable leveling plate and a lower slidable leveling plate, which are placed at an upper side and a lower side, respectively, to overlap with each other in a positioning recess of the feeder and are slidable in a direction perpendicular to an extending direction of the supply passage; and the upper slidable leveling plate and the lower slidable leveling plate are respectively slidable toward opposite sides, which are opposite to each other, relative to an imaginary line that extends through a center of the supply passage in a sliding direction of the feeder to cut off and thereby level the powder material placed in the supply passage.

5. The powder supply apparatus according to claim 4, wherein when the feeder is slid from the supplying position to the retreated position, the powder material, which is placed in the molding hole, is cut off and is thereby leveled with the feeder.

6. A powder supply apparatus comprising a feeder that has a supply passage, which supplies powder material to a molding hole of a die, wherein:

at least a lower end portion of the supply passage extends in a vertical direction and has a cross section that has a shape that coincides with a shape of a cross section of the molding hole that extends in the vertical direction;

the feeder is linearly slidable between a retreated position, at which the feeder is retreated from a location above the molding hole, and a supplying position, at which the feeder is placed at the location above the molding hole and is opposed to the molding hole;

the feeder includes an upper slidable leveling plate and a lower slidable leveling plate, which are placed at an upper side and a lower side, respectively, to overlap with each other in a positioning recess of the feeder and are slidable in a direction perpendicular to an extending direction of the supply passage; and the upper slidable leveling plate and the lower slidable leveling plate are respectively slidable toward opposite sides, which are opposite to each other, relative to an imaginary line that extends through a center of the supply passage in a sliding direction of the feeder to cut off and thereby level the powder material placed in the supply passage.

7. The powder supply apparatus according to claim 6, comprising a hopper that is formed separately from the feeder and has an accumulation passage, through which the powder material passes down into the supply passage, wherein:

the supply passage extends linearly in the vertical direction throughout an entire extent of the supply passage and has the cross section that has the shape, which coincides with the shape of the cross section of the molding hole; and at least a lower end portion of the accumulation passage extends in the vertical direction and has a cross section that has a shape, which coincides with the shape of the cross section of the supply passage.

8. The powder supply apparatus according to claim 7, wherein:

the hopper includes an upper shutter and a lower shutter that are placed at an upper side and a lower side, respectively, in the vertical direction to partition a portion of the accumulation passage into a measuring passage portion, which has a predetermined volume, in such a manner that the portion of the accumulation passage is cut from the rest of the accumulation passage in an extending direction of the accumulation passage; and the powder material, the amount of which is measured in the measuring passage portion, is supplied from the accumulation passage into the supply passage.

9. The powder supply apparatus according to claim 8, comprising a sensor configured to sense presence of the powder material in the supply passage, wherein:

the sensor is configured to sense whether the powder material, the amount of which is measured with the measuring passage portion and is in a predetermined range, is present in the supply passage; and the feeder is slid to a location above the molding hole and supplies the powder material from the supply passage into the molding hole after the sensor senses that the powder material, the amount of which is measured with the measuring passage portion and is in the predetermined range, is present in the supply passage.

10. The powder supply apparatus according to claim 6, wherein when the feeder is slid from the supplying position to the retreated position, the powder material, which is placed in the molding hole, is cut off and is thereby leveled with the feeder.

11. The powder supply apparatus according to claim 1, wherein the supply passage is a single supply passage formed in the feeder.

12. The powder supply apparatus according to claim 1, wherein the molding hole is shaped into a cylindrical form.

13. A powder supply apparatus comprising
a feeder that has a supply passage, which supplies powder material to a molding hole of a die; and
a hopper that is formed separately from the feeder and has an accumulation passage, through which the powder material passes down into the supply passage, wherein:
the supply passage extends linearly in a vertical direction while a cross section of the supply passage is constant along an entire extent of the supply passage and has a size and a shape, which coincide with a size and a shape of a cross section of the molding hole that extends in the vertical direction;
at least a lower end portion of the accumulation passage extends in the vertical direction and has a cross section that has a size and a shape that coincide with the size and the shape of the cross section of the supply passage;
the hopper includes an upper shutter and a lower shutter that are placed at an upper side and a lower side, respectively, in the vertical direction to partition a portion of the accumulation passage into a measuring passage portion, which has a predetermined volume, in such a manner that the portion of the accumulation passage is cut from the rest of the accumulation passage in an extending direction of the accumulation passage; and
the powder material, the amount of which is measured in the measuring passage portion, is supplied from the accumulation passage into the supply passage.

14. The powder supply apparatus according to claim 13, comprising a sensor that senses presence of the powder material in the supply passage, wherein:
the sensor senses whether the powder material, the amount of which is measured with the measuring passage portion and is in a predetermined range, is present in the supply passage; and
the feeder is slid to a location above the molding hole and supplies the powder material from the supply passage into the molding hole after the sensor senses that the powder material, the amount of which is measured with the measuring passage portion and is in the predetermined range, is present in the supply passage.

* * * * *